United States Patent Office 3,170,298
Patented Feb. 23, 1965

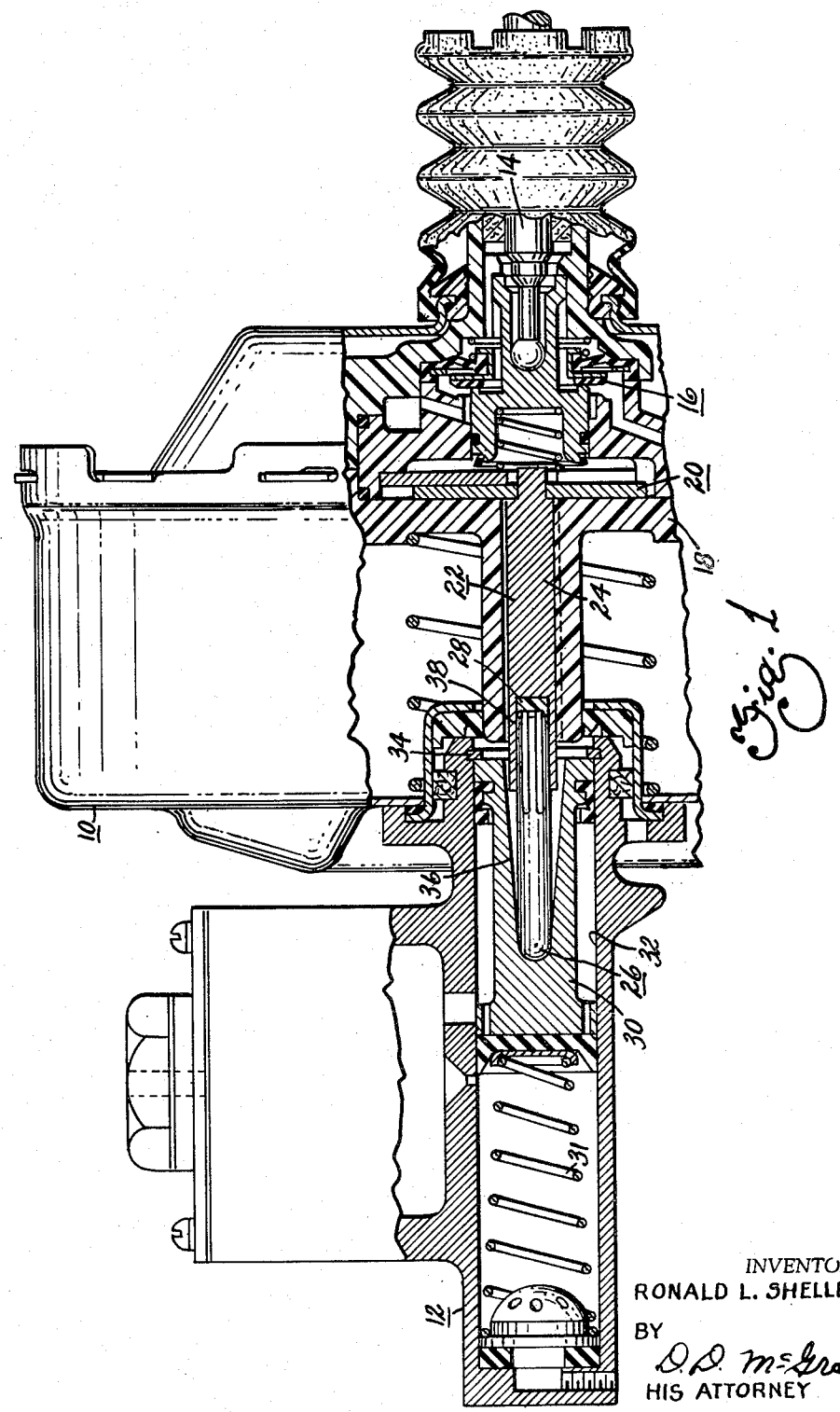

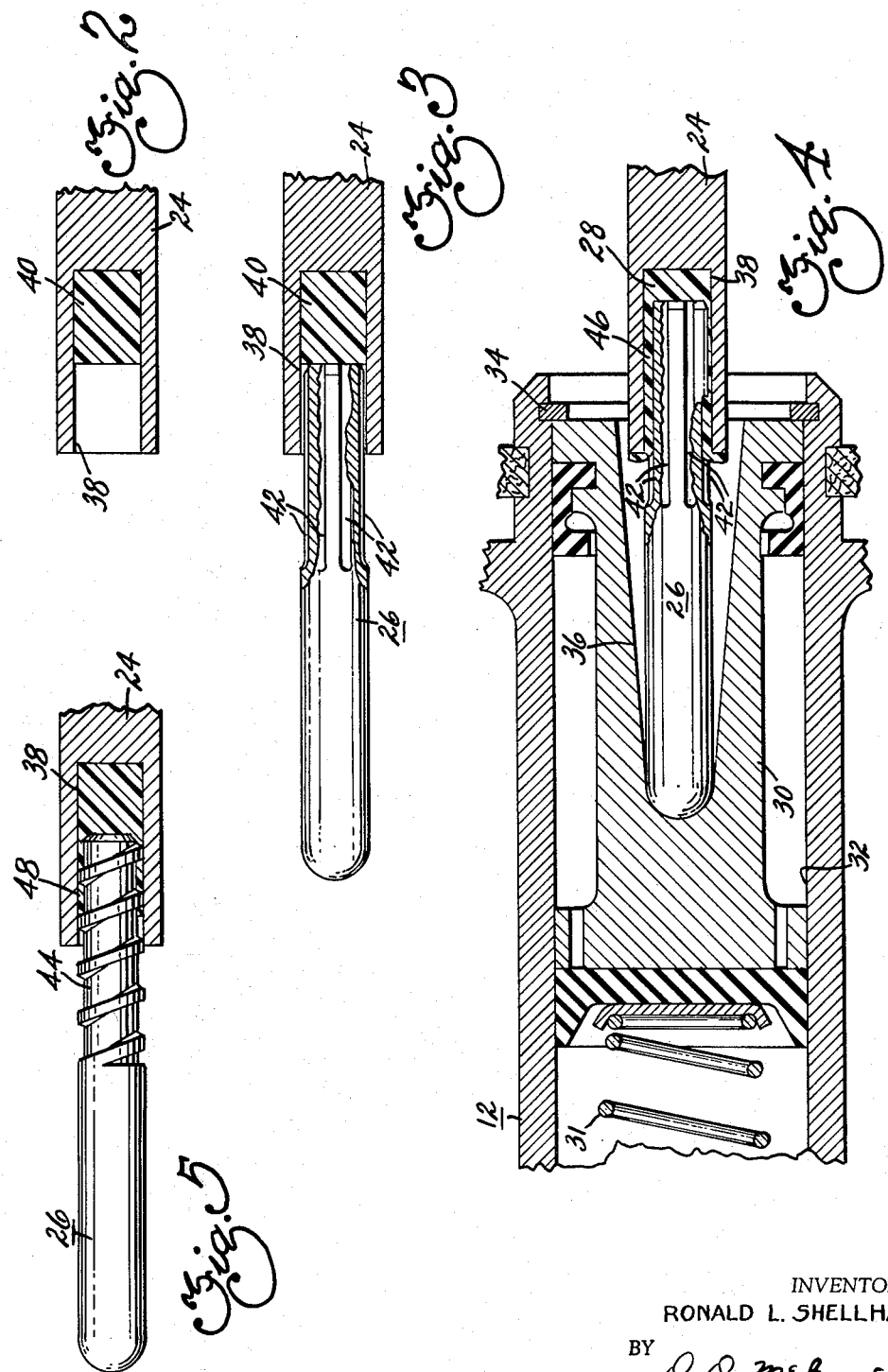

3,170,298
METHOD AND APPARATUS FOR COMPENSATING FOR TOLERANCE STACK LIMITS IN A POWER BRAKE UNIT
Ronald L. Shellhause, Vandalia, Ohio, assignor to General Motors Corporation, Detroit, Mich., a corporation of Delaware
Filed Nov. 9, 1962, Ser. No. 236,499
19 Claims. (Cl. 60—54.6)

The invention relates to a force-transmitting assembly and more particularly to one which must have a definite preset length which is dependent upon several outside factors such as the tolerance stack limits of the apparatus in which the assembly is used. The invention is particularly concerned with establishing the length of the force-transmitting assembly in situ. The preferred embodiment disclosed herein utilizes the invention to compensate for tolerance stack-ups encountered between the master cylinder piston and the power head assembly of a power brake unit.

Due to the number of elements and subassemblies used in power brake units, the push rods which transmit the forces from the booster power walls to the master cylinder pistons should ideally be manufactured in slightly varying lengths so as to compensate for the tolerance high and low limit stacks. It is not only uneconomical to manufacture one component in such varying sizes but it is also quite difficult to determine the exact size of the push rod which would be required without completely assembling the parts and placing them in a condition wherein the tolerance stack can be determined. It is now proposed to provide a self-adjusting push rod which can be installed during assembly of the power brake unit and will have its correct length established during the assembly operation. The push rod may be assembled from parts which include a self-adjusting shim preferably made of a hard setting plastic. Any gelatinous original state material that chemically sets to a hard condition after a short period of time is suitable. As an example only, certain epoxy resins have been found to give excellent results. Other plastic materials having the desired features may be used.

In the drawings:
FIGURE 1 is a side view of a power brake unit embodying the invention and having parts broken away and in section.

FIGURE 2 is an enlarged somewhat schematic view of the first step in assembling the mechanism embodying the invention and showing the resin in place before it has set.

FIGURE 3 illustrates the next step in performing the method embodying the invention wherein the plastic shim is in its first step of adjustment.

FIGURE 4 is an enlarged view of a portion of FIGURE 1 showing the plastic shim in the hard set position.

FIGURE 5 is similar to FIGURE 3 and shows a modified construction.

The power brake unit of FIGURE 1 in which the invention may be embodied includes the booster assembly 10 and the master cylinder assembly 12. The push rod 14 is suitably attached to the brake pedal linkage and actuates the booster valving 16. The booster power wall 18 is connected through the reaction assembly 20 to the push rod assembly 22. The push rod assembly 22 includes the power transmitting member 24, the push rod adjusting member 26 and the hard set plastic shim 28. The master cylinder assembly 12 has a master cylinder piston 30 and piston return spring 31 received within the master cylinder bore 32 for actuating the hydraulic portion of a brake system in the usual manner. A master cylinder piston stop ring 34 is provided in the booster end of the bore 32 against which the rear end of the master cylinder piston 30 abuts in the full brake release position as illustrated in FIGURE 1. The piston 30 has a flared recess 36 in which the push rod adjusting member 26 is received so that it can transmit the brake apply and reaction forces between the piston 30 and the power transmitting member 24. The power transmitting member 24 is provided with a generally cylindrical recess 38, as is better shown in FIGURE 2. The shim 28 is received in the bottom of the recess 38.

In order to establish the correct length of the push rod assembly 22 for the particular power brake unit in which it is installed, a hard settable plastic 40 is positioned in the bottom of the recess 38 as shown in FIGURE 2. The plastic is preferably in a gelatinous original state and will chemically set to a hard condition shortly after being exposed to the atmosphere. The push rod adjusting member 26 is provided with suitable plastic escape means such as the flutes 42, or other suitable plastic escape means may be provided such as the thread land and groove arrangement of FIGURE 5. In that instance the groove 44 acts as a plastic escape means. If desired, plastic escape means may be also or alternatively provided in a suitable portion of the power transmitting member 24.

The adjusting member 26 is inserted in the recess 38 and the master cylinder assembly 12 is secured to the booster 10. The booster, having no fluid pressure thereon other than atmospheric pressure, normally assumes the zero braking position, and the power wall 18 is in the position shown in FIGURE 1. Force applied to the forward end of the master cylinder piston 30 by the spring 31 moves the piston rearwardly until it engages the stop 34. This at the same time moves the push rod adjusting member 26 rearwardly and further into the recess 38. The inserted end of the adjusting member 26 acts as a piston against the gelatinous plastic 40 and extrudes the excess plastic through the plastic escape means provided. The extrusion of the plastic is particularly illustrated at 46 in FIGURE 4 and 48 in FIGURE 5. The amount of plastic or resin 40 originally supplied is preferably such that within normal tolerance limits the plastic extrudes only to the end of the recess 38 under conditions wherein the adjusting member 26 moves to its furthest point in recess 38. The entire assembly is held in this position for a short period of time until the plastic 40 has set to a hard condition. After the plastic has set to provide the shim 28, it becomes a force-transmitting portion of the overall push rod assembly 22. The plastic material may also have sufficient adhesive qualities to hold the assembly together.

In order to permit removal of the adjusting member 26 should field service requirements indicate piston replacement, the end of the adjusting member 26 inserted into the recess 38 may have a thin lubricant coating to facilitate removal. If a threaded plastic escape means is utilized, the adjusting member 26 may be more easily screwed out of the hard plastic. When the fluted type is utilized it may be pulled out with a reasonable force. After the adjusting member 26 is removed, the service mechanic then drills out the entire shim, replaces the necessary parts of the power brake unit, adds fresh plastic from a repair kit tube, and reassemblies the unit in the same manner as previously described. This permits new self-shimming by the method originally used in manufacturing the unit.

The invention may also be employed in other force-transmitting assemblies wherein the final lengths of the assemblies are determined by associated parts in situ.

A method and preferred structures have been disclosed embodying the invention which permit a self-adjusting rod to compensate for tolerance stack limits encountered between two elements of an overall assembly joined by the self-adjusting rod, with the rod in place in the assembly. The assembly does not have to be torn down after establishing the required rod length.

What is claimed is:

1. A brake booster power wall-to-master cylinder piston push rod assembly comprising,
    a first rod member actuable by the booster power wall and having a cylinder formed in one end,
    a second rod member for engaging the master cylinder piston and having one end thereof received in said cylinder a distance determined by the distance between the master cylinder piston rear stop and the brake release position of the booster power wall,
    and a hard set in situ plastic in said cylinder joining said rod members into a force-transmitting push rod assembly.

2. The push rod assembly of claim 1, further characterized by one of said rod members having plastic escape means containing excess plastic flowed from the confined space of said cylinder.

3. The push rod assembly of claim 2, said plastic escape means further providing interference type holding means wherein said hard set in situ plastic therein is firmly held to said one rod member.

4. The push rod assembly of claim 2, said plastic escape means being provided in the form of flutes.

5. The push rod assembly of claim 2, said plastic escape means being provided adjacent one end of said one rod member and having a land and groove conformation.

6. The push rod assembly of claim 2, said plastic escape means being formed by a thread whereby the plastic escape means includes the thread groove.

7. The push rod assembly of claim 1, further characterized by said second rod member having plastic escape means formed thereon at the end thereof in said cylinder and containing excess plastic flowed from the confined space of said cylinder.

8. The push rod assembly of claim 1, said second rod member having the end thereof engaging said plastic precoated with a lubricant to facilitate its later removal from said hard set plastic.

9. The push rod assembly of claim 1, at least one of said rod members having the surface thereof engaging said plastic precoated with a lubricant to facilitate later separation of said hard set plastic therefrom.

10. A push rod assembly of a predetermined length comprising,
    a first rod member having a recess formed in one end thereof,
    a second rod member having one end thereof received in said recess a distance establishing the assembly predetermined length,
    and a hard set in situ plastic shim in said recess having a portion thereof surrounding said one end of said second rod member and the main body thereof filling the bottom portion of said recess not occupied by said second rod member and in force-transmitting relation to said first and second rod members.

11. The push rod assembly of claim 10, further characterized by one of said rod members having plastic escape means containing excess plastic flowed from the bottom portion of said recess and providing the plastic shim portion surrounding said one end of said second member.

12. The push rod assembly of claim 11, said plastic escape means further providing interference type holding means wherein said hard set in situ plastic therein is firmly held to said one rod member.

13. The push rod assembly of claim 11, said plastic escape means being provided in the form of flutes.

14. The push rod assembly of claim 11, said plastic escape means being provided adjacent one end of said one rod member and having a land and groove conformation.

15. The push rod assembly of claim 11, said plastic escape means being formed by a thread whereby the plastic escape means includes the thread groove.

16. The push rod assembly of claim 10, further characterized by said second rod member having plastic escape means formed thereon in the end thereof in said recess and containing excess plastic flowed from the bottom portion of said recess.

17. The push rod assembly of claim 10, said second rod assembly having the end thereof engaging said plastic precoated with a lubricant to facilitate its later removal from said hard set plastic.

18. The push rod assembly of claim 10, at least one of said rod members having the surface thereof engaging said plastic precoated with a lubricant to facilitate later separation of said hard set plastic therefrom.

19. The method of assembling and adjusting a brake master cylinder and booster unit having a recessed master piston and a master piston stop and a recessed member transmitting power from the booster power wall and a rod having the opposite ends thereof received in the recesses in force-transmitting relation, said method comprising the steps of,
    loading said recessed power transmitting member recess with a given volume of hard setting resin before the resin has set,
    inserting the opposite ends of the rod respectively into the master piston recess and the power transmitting member recess,
    positioning the power transmitting member and the rod in a desired relation to the piston stop by movement of the master piston against the piston stop and simultaneously moving the rod further into the power transmitting member and extruding a portion of the resin by hydraulic action,
    and allowing the resin to set with the parts remaining in position to provide a rigid force transfer member of a desired length intermediate the master piston and the power transmitting member.

References Cited in the file of this patent

UNITED STATES PATENTS

| | | |
|---|---|---|
| 1,195,118 | Weida | Aug. 15, 1916 |
| 1,831,144 | Shearer | Nov. 10, 1931 |
| 2,862,366 | Ingres et al. | Dec. 2, 1958 |